(12) United States Patent
Borghi

(10) Patent No.: US 6,614,239 B2
(45) Date of Patent: Sep. 2, 2003

(54) PROCESS AND SYSTEM FOR MEASURING THE DISTANCE OF A MOVING BODY FROM A FIXED PART

(75) Inventor: Luigi Borghi, Modena (IT)

(73) Assignee: Comau SpA, Turin (IT)

( * ) Notice: Subject to any disclaimer, the term of this patent is extended or adjusted under 35 U.S.C. 154(b) by 14 days.

(21) Appl. No.: 10/054,348

(22) Filed: Jan. 18, 2002

(65) Prior Publication Data
US 2002/0097058 A1 Jul. 25, 2002

(30) Foreign Application Priority Data
Jan. 19, 2001 (IT) ........................................ TO01A0035

(51) Int. Cl.[7] ........................... G01R 27/04; G01S 13/08
(52) U.S. Cl. ..................... 324/644; 342/127; 342/125
(58) Field of Search .......................... 324/644; 342/125, 342/127, 135, 174, 42, 126; 356/508, 4.09; 367/99, 125

(56) References Cited

U.S. PATENT DOCUMENTS

| 4,170,773 A | | 10/1979 | Fitzsimmons et al. ........ 342/42 |
| 4,454,512 A | * | 6/1984 | Millett ....................... 342/125 |
| 4,621,926 A | | 11/1986 | Merry et al. ................ 356/508 |
| 4,714,339 A | | 12/1987 | Lau et al. ................... 356/4.09 |
| 4,757,315 A | | 7/1988 | Lichtenberg et al. ...... 342/125 |
| 4,804,961 A | | 2/1989 | Hane .......................... 342/125 |
| 5,162,862 A | * | 11/1992 | Bartram et al. ............ 356/5.15 |
| 5,170,172 A | * | 12/1992 | Weinstein ................... 342/385 |
| 6,111,536 A | * | 8/2000 | Richards et al. ........... 342/125 |

FOREIGN PATENT DOCUMENTS

JP    57 007511    1/1982

* cited by examiner

Primary Examiner—N. Le
Assistant Examiner—Wasseem H. Hamdan
(74) Attorney, Agent, or Firm—TraskBritt

(57) ABSTRACT

A process and a system for measuring the distance of a moving body (12) from a fixed part (10), characterized the steps of: generating a first alternating signal ($r_{(t)}$) having a frequency within the radio-wave range or elastic-wave range; emitting the first signal from the fixed part towards the moving body (12); receiving the first signal ($r_{(t)}$) on the moving body (12) and generating, on the moving body (12), a second signal ($s_{(t)}$) having a frequency (nf) equal to the frequency of the first signal ($r_{(t)}$) multiplied by a constant factor (n), the second signal ($s_{(t)}$) having an initial phase ($\phi_1$) equal to the phase ($2\pi f t_1 + \phi$) at the instant ($t_1$) in which it is received by the moving body (12); generating, on the fixed part, a third signal ($u_{(t)}$) having a frequency (nf) equal to the frequency of the second signal ($s_{(t)}$) and an initial phase ($\phi_0$) equal to the initial phase of the first signal ($r_{(t)}$); and determining the variation in distance of the moving body (12) in a pre-set time interval as a formation of the variation in the amplitude of an alternating signal obtained from the sum of the second signal ($s_{(t)}$) and the third signal ($u_{(t)}$) in the same time interval.

10 Claims, 4 Drawing Sheets

PROCESS AND SYSTEM FOR MEASURING THE DISTANCE OF A MOVING BODY FROM A FIXED PART

FIELD OF THE INVENTION

The present invention relates to a process and system for measuring without contact the distance of a moving body from a fixed part.

The present invention has been developed with particular attention paid to the field of numeric-control machine tools, but it may be applied to any field where it is required to measure, with a high degree of precision and without contact, the position of a moving body in an area space having dimensions ranging between a few centimeters and tens of meters.

BACKGROUND OF THE INVENTION

A system widely used on cartesian-type machines employs optical straightedges set along the three axes of movement of the moving body. Each optical straightedge measures the position of the moving body along the corresponding axis, and, in order to determine the position of the body in space, it is assumed that the three axes are set at 90° with respect to one another. This assumption inevitably introduces errors in the case where the axes of movement of the machine are not perfectly at right angles to one another.

To prevent this type of error, attempts have been made to develop systems for measuring the position of a moving body that are independent of the drive system that imparts motion on the moving body. The said systems may be identified as measuring systems "without contact" in so far as they do not require a mechanical contact between the fixed part and the object to be measured. The systems currently known and available on the market can be divided into three categories:

- systems using magnetic sensors;
- systems based on the measurement of the time of flight of ultrasonic signals, radio signals (radar), or laser beams;
- systems based on the angle of reflection of a laser beam; and
- laser-interferometry systems.

The systems using magnetic sensors have limited possibilities of application in so far as they need to be very close to (i.e., almost in contact with) the moving body.

Ultrasonic measuring systems based upon the calculation of the time of flight offer poor precision (in the region of 2–3 mm) and are far from easily applicable in the case of distances exceeding 3 meters.

Existing electromagnetic-carrier systems (laser or radio systems) based upon the time of flight afford very poor resolution.

Laser-interferometry systems are not readily applicable to bodies moving in a three-dimensional space in so far as they constantly require a substantial alignment between a laser-beam source and the moving body. These measuring systems moreover present problems when the environment where the measurement is performed has non-homogeneous characteristics, due, for example, to the presence of fumes, smoke, lubricants, and swarf dust or machining residue, as normally occurs in the field of machine tools.

SUMMARY OF THE INVENTION

The object of the present invention is to provide a process and a system for measuring the position of a moving body that are not affected by the drawbacks referred to above.

In accordance with the present invention, the above object is achieved by a process and a system having the characteristics that form the subject of the ensuing claims.

The present invention is essentially based upon the application of the principle of interferometry to radio waves and ultrasonic waves for the implementation of direct measuring systems that can be used even in opaque environments and in non-linear three-dimensional space.

BRIEF DESCRIPTION OF THE DRAWINGS

The present invention will now be described with reference to the attached drawings, which are provided purely by way of non-limiting example and in which.

DETAILED DESCRIPTION OF THE INVENTION

Figure 1:
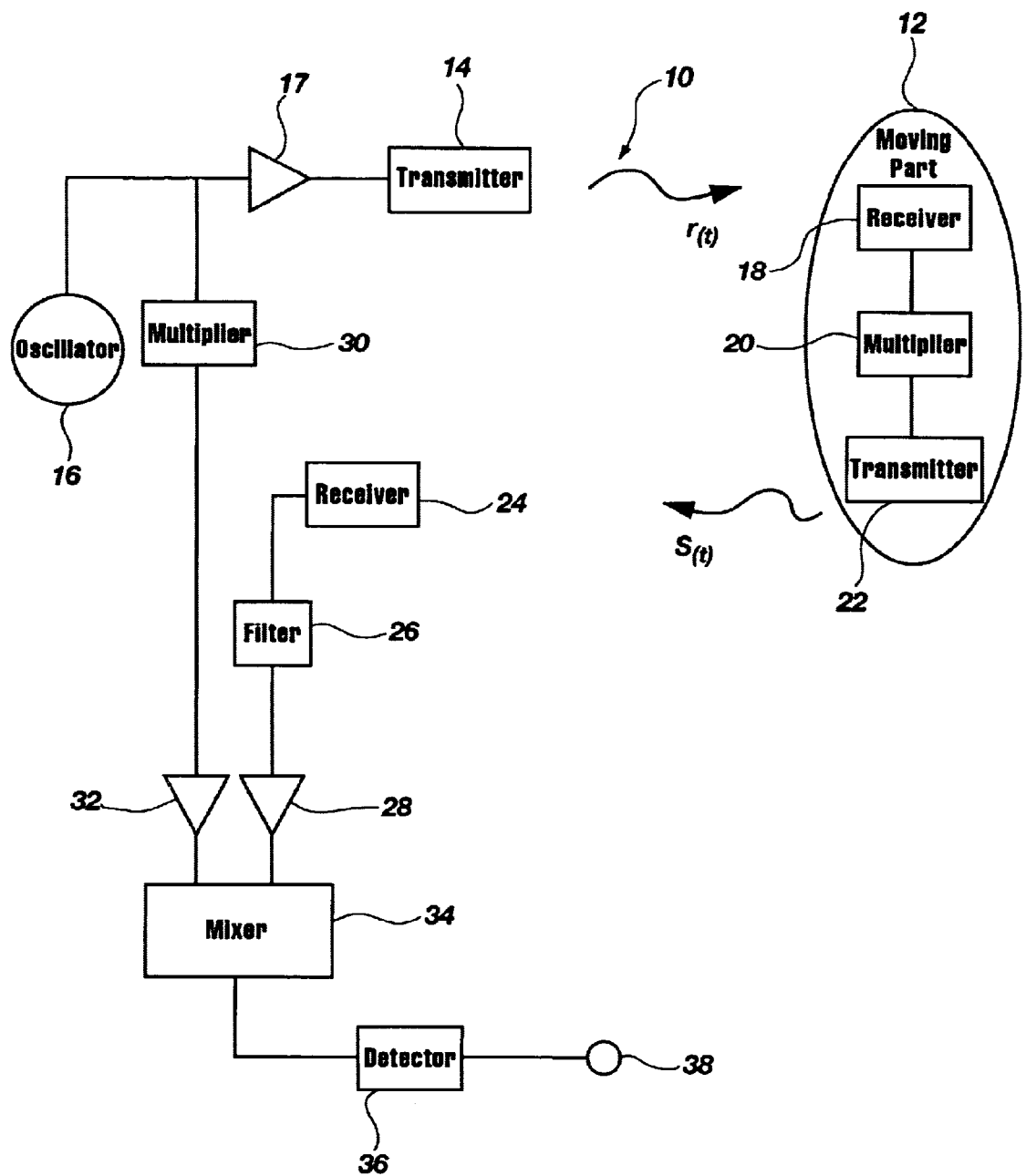
FIG. 1 is a block diagram illustrating the operating principle on which the present invention is based.

With reference initially to FIG. 1, in its simplest embodiment the system according to the present invention comprises a stationary part 10 fixed to the reference body and a moving part 12 fixed to the body the distance of which from the reference body is to be measured. Between the fixed part and the moving part there is a propagation medium, which may be a vacuum, air or any other gas, water or any other liquid.

The stationary part 10 comprises a signal transmitter 14 associated to an oscillator 16 which generates a sinusoidal alternating signal having a preset frequency. The signal transmitted by the transmitter 14 may be a radio wave having a frequency of between 3 kHz and 300 GHz, and preferably of between 10 and 300 GHz. Alternatively, the signal could be an acoustic wave having a frequency of between 40 kHz and 10 MHz. In the latter case, the transmitter 14 is constituted by a piezoelectric transducer. The signal is aimed at the moving part 12, which comprises a receiver 18 tuned to the transmission frequency f of the transmitter 14. The signal received by the receiver 18 is frequency multiplied by a multiplier 20 and is sent back to the fixed part 10 by a transmitter 22 integral with the moving part 12. The signal with frequency nf (where n is the factor of multiplication) is rigidly locked to the phase of the signal received by the receiver 18. The phase delay introduced by the multiplier 20 is constant and does not modify the rigid phase relationship between the signals f and nf. In the case where the moving part 12 multiplies by two the frequency of the signal received, the frequency multiplier 20 may be constituted by a diode-bridge doubler, which guarantees rigid phase synchronization between the input signal with frequency f and the output signal with frequency 2f.

The signal emitted by the fixed part is a sinusoidal function of time, which can be expressed by the formula $R_{(t)} = R \sin(2\pi f t + \phi_0)$. The signal that is transmitted by the transmitter 22 of the moving part 12 is a sinusoidal function with frequency nf which can be represented by the formula $s_{(t)} = S \sin(2\pi n f t + \phi_1)$. If $t_1$ is the instant at which the signal $r_{(t)}$ is received by the receiver 18 of the moving part 12, the initial phase $\phi_1$ of the signal $s_{(t)}$ must be such that at the instant $t_1$ the phase of the signal $s_{(t)}$ is equal to the phase of the signal $r_{(t)}$; namely, $2\pi nft_1+\phi_0=2\pi nft_1+\phi_1$, whence we obtain $\phi_1=\phi_0-2\pi ft_1(n-1)$.

The signal $s_{(t)}$ is received by a receiver 24 carried by the fixed part 10 and tuned to the frequency nf. The fact that the transmitter 14 and the receiver 24 of the fixed part 10 are tuned to different frequencies prevents the signal emitted by the transmitter 14 from interfering with the receiver 24. In the receiver 24 the signal $s_{(t)}$ is filtered in frequency by a filter 26, and subsequently its amplitude S is normalized by a constant-output-amplitude amplifier 28.

Upstream of the transmitter 14, the signal $r_{(t)}$ is multiplied in frequency by a multiplier 30 similar to the multiplier 20 of the moving part 12. The multiplier 30 produces a signal having a frequency equal to that of the signal $s_{(t)}$ and an initial phase identical to that of the signal $r_{(t)}$. The signal $u_{(t)}$ can therefore be represented by the relation $u_{(t)}=U \sin(2\pi nft+\phi_0)$. The signal $u_{(t)}$ is normalized by a constant-output-amplitude amplifier 32 in such a way that at output from the amplifiers 28 and 32 the signals $s_{(t)}$ and $u_{(t)}$ have equal amplitudes S and U. The two signals are sent to a mixer 34 which performs the sum of the two sinusoidal signals. In the mixer 34, two sinusoidal signals having the same amplitude, the same frequency, and a different initial phase are then added together. The result is a sinusoidal signal having the frequency nf and an amplitude that varies as a function of the relative phase difference between the two signal $s_{(t)}$ and $u_{(t)}$, i.e., as a function of the difference between the respective initial phase differences $\phi_1$ and $\phi_0$. The signal leaving the mixer 34 is sent to a signal-power or signal-amplitude detector 36, which supplies an output signal proportional to the amplitude of the input signal.

FIGS. 4 to 7 illustrate the sum of two sinusoidal functions having the same amplitude, the same frequency, and a different phase. The relative phase difference $\delta\phi$ is 0° in FIG. 4, 45° in FIG. 5, 90° in FIG. 6, and 135° in FIG. 7. As may be noted, the sum of the two signals has an amplitude which is maximum when the two signals s and u are in phase with one another (FIG. 4) and decreases progressively as the relative phase difference increases. The resultant signal becomes 0 when $\delta\phi=180°$, i.e., in the case where the signals $s_{(t)}$ and $u_{(t)}$ are in phase opposition with respect to one another. Consequently, on the output terminal 38 a signal is obtained the amplitude of which is proportional to the phase difference $\delta\phi=\phi_0-\phi_1$. From relation [1] we have $\delta\phi=\phi_0-\phi_1=2\pi ft_1(n-1)$, where $t_1$ represents the time taken by the signal $r_{(t)}$ transmitted at the instant $t_0=0$ to cover the distance d between the fixed part and the moving part. Hence, $t_1=d/c$, where c is the speed of propagation of the signal in the medium. Therefore, the output signal on the terminal 38 is a measurement of the distance of the moving body from the fixed part. If the body 12 is stationary, the output signal on the terminal 38 has a constant value. If the body 12 is moving, the output signal 38 varies with a frequency which is proportional to the speed of displacement. The distance covered by the moving body 12 may, for example, be determined by counting the number of times the output signal 38 passes through a pre-set threshold (for example 0). Each passage of the output signal 38 through 0 is equivalent to a phase difference of 360° between $\phi_1$ and $\phi_0$, which is in turn equivalent to a displacement of the moving body by a length equal to the wavelength $\lambda$ of the signal. Consequently, by counting the number of times the output signal 38 passes through 0 a measurement is obtained of the distance covered by the moving body with a precision equal to the wavelength of the signal. This precision can be improved by taking into account the difference between the amplitude of the output signal 38 between start and end of a sampling interval. In this way it is possible to determine also the fraction of wavelength covered down to approximately 1/1000 $\lambda$. The overall precision of the measuring system thus attains the order of 0.001 $\lambda$. The distance covered by the moving body can be measured at pre-set time intervals, for example in the region of 2 ms. In this way, the control unit that controls movement of the moving body 12 knows the exact position of the body every 2 ms.

The measuring system described with reference to FIG. 1 makes it possible to determine the position (recession or approach) of the moving body along the axis of the cone of influence of the transmitter 14 or 22. The position of the body in a three-dimensional space may be obtained simply by setting the three measuring devices orthogonal with respect to one another and operating according to the same principle, and having the moving complex 12 operating in a region of working space lying within the three lobes (cones of influence) simultaneously.

Figure 2:
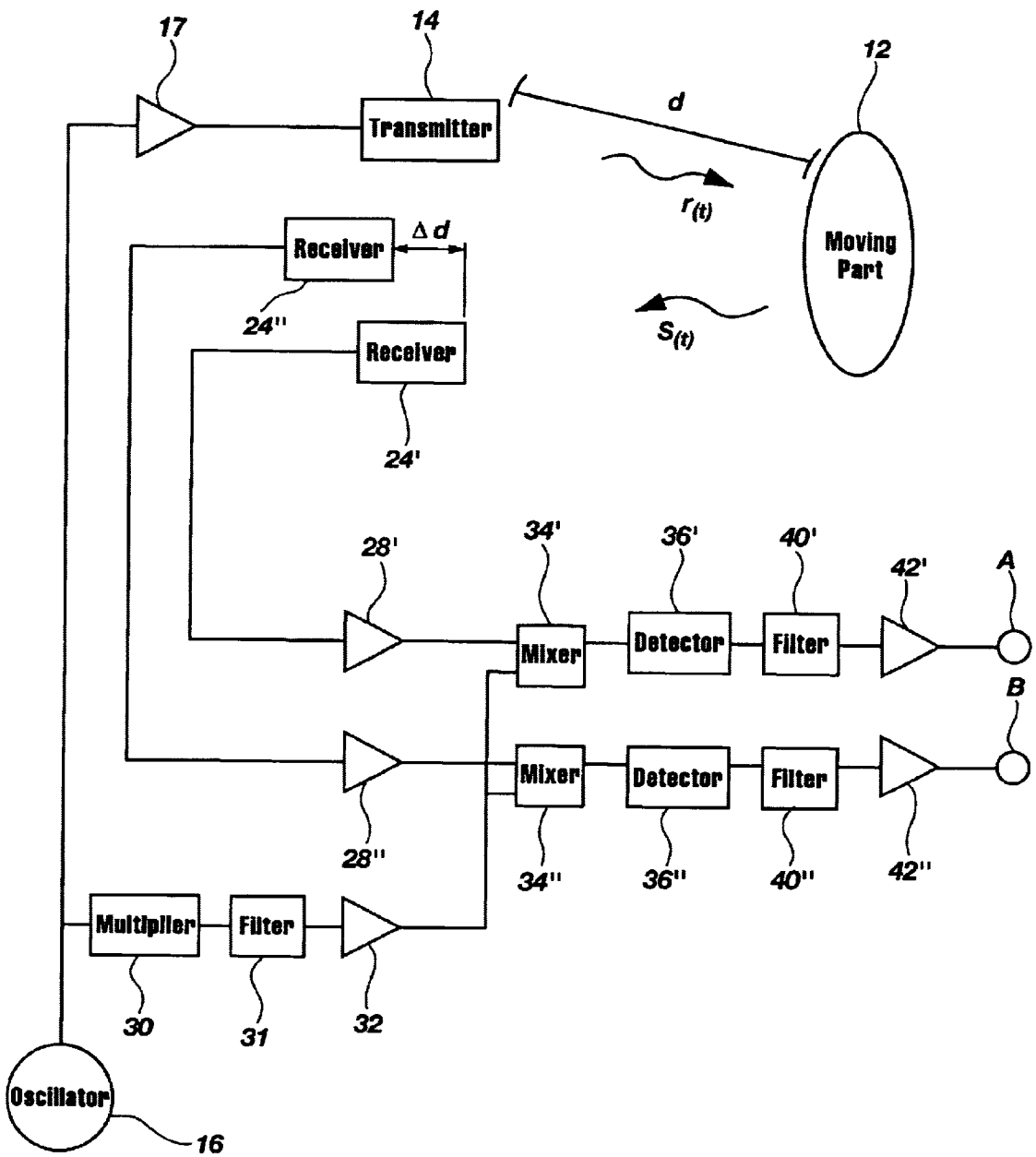
FIG. 2 is a block diagram of a system according to the invention designed to distinguish the direction of motion of a moving body.

The system described with reference to FIG. 1 is able to determine with a high degree of precision the distance covered by the moving body 12 in a given time interval, but is not able to determine the direction of motion of the moving body; i.e., it is not able to determine whether the distance measured has been covered by the moving body as it is receding from or approaching the fixed part. The variant embodiment of the measuring system illustrated in FIG. 1 makes it possible to overcome this problem. In FIG. 2, the components identical to those described previously are designated with the same reference numbers or with corresponding reference numbers. Also in this case, the moving body 12 is provided with a signal receiver, a frequency multiplier and a transmitter of the signal with multiplied frequency. With respect to the variant described previously, provided on the fixed part 10 are two receivers 24', 24" associated to respective constant-output-power amplifiers 28', 28". Also in the present case, the signal with frequency f generated by the oscillator 16 is multiplied in frequency by a multiplier 30 and is normalized by a constant-output-amplitude amplifier 32. Preferably, a filter 31 is set between the multiplier 30 and the amplifier 32. The two receivers 24', 24" are shifted with respect to one another by a distance $\delta d$ equal to a fraction of the wavelength $\lambda$ of the signal transmitted by the moving body, plus possibly an integer number of wavelengths, according to the relation $\delta d=p\lambda+q/\lambda$, where p is an integer equal to or greater than 0, and q is an integer equal to or greater than 2, and is preferably 4. The two receivers 24' and 24" receive respective signals $s'_{(t)}$ and $s''_{(t)}$ which are out of phase with respect to one another by an angle of 360°/q. After the normalization performed by the amplifiers 28' and 28", the signals $s'_{(t)}$ and $s''_{(t)}$ are sent to respective mixers 34' and 34", where each of them is added to the normalized signal $u_{(t)}$ coming from the amplifier 32. The signals leaving the mixers 34', 34" pass on to respective signal-power or signal-amplitude detectors 36', 36" and, after passing through respective filters 40', 40", are sent to respective output amplifiers 42' and 42". On the two outputs designated by A and B two constant signals are obtained which have different amplitudes when the body 12 is stationary. When the body 12 is moving, the two signals on the outputs A and B have an alternating variation with the same maximum amplitude and the same frequency but a different initial phase difference. According to whether the signals A and B are both increasing or both decreasing, or one of them is increasing and the other decreasing, it is possible to establish the direction of motion of the moving body 12, i.e., whether it is approaching the fixed part or moving away from it.

It is important to emphasize that the distance δd between the two receivers 24', 24" in the case of radio signals must be understood as difference in electric path between the input of the antenna of each receiver and the node of the respective mixer 34', 34". This difference must remain constant in time. To obtain this result it is sufficient to make the position of one of the two receivers adjustable, with micrometric regulation with a maximum travel equal to the wavelength of the signal.

In the case where the signal is an ultrasonic wave, the time of travel of the electric signal after the conversion undergone of two receivers 24', 24" (transducers) to reach the mixers 34', 34" is negligible if compared with the path of the signal in air. Their ratio is almost 1 ppm. Possible differences in the propagation of the electric signal between the two channels do not affect the calculation of the difference in the time of flight of the signal between the two receivers (piezoelectric transducers).

In the case where the signal has a frequency in the microwave range, instead, it is necessary for the electric path of the output signal from the receiver (antenna) inside the mixer to be identical because the ratio between the speed of propagation of the signal in air and the speed of the electric signal in the two channels, including the propagation times of the electronic devices, is almost 1:1.

The same considerations also apply to the electric path of the reference signal $u_{(t)}$ from its generation at output from the constant-output-amplitude amplifier 32 to the node of the two mixers 34', 34". In the case of microwave signals, these two paths (understood in terms of propagation time) must be identical. Possible differences, which on the other hand are unavoidable, can be compensated for through fine adjustment of the physical position of one of the two receivers 24', 24" in the system-calibration phase.

An embodiment of the system according to the invention that presents a further improvement will now be described with reference to FIG. 3, in which the same reference numbers as those of FIG. 2 are used for the parts in common.

The measuring precision of the system according to the invention is the higher, the more constant the speed of propagation of the signal. A possible variation in the permeability of the medium, given the same frequency of the signal, would cause a variation in the wavelength and would have a negative impact on the precision of the system.

Figure 3:
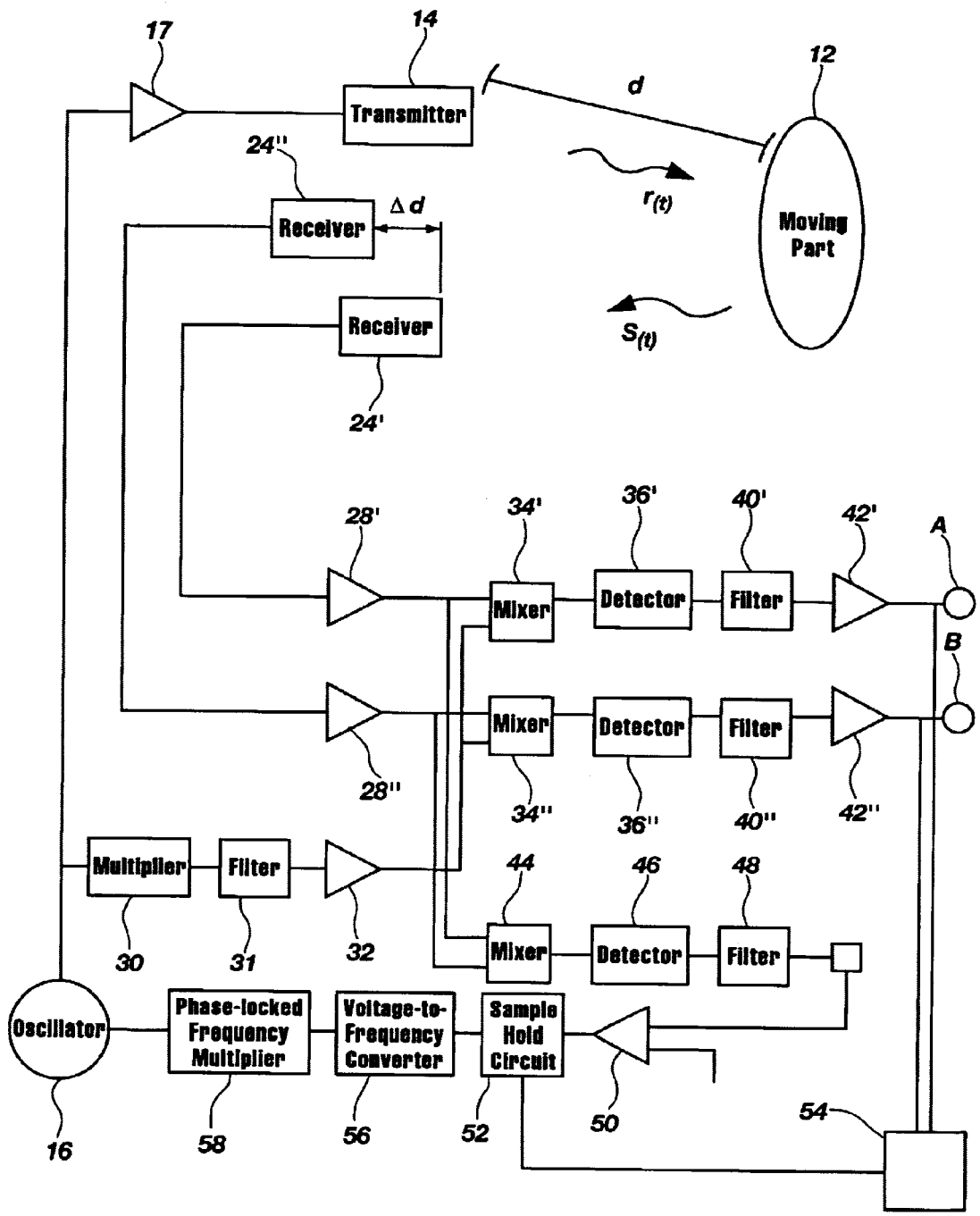
FIG. 3 is a block diagram of the system of FIG. 2 designed for compensating the variation in permeability of the signal-propagation medium.
Figure 4:
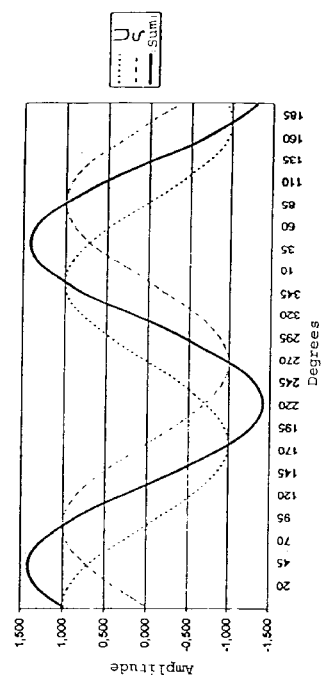
FIGS. 4–7 are diagrams illustrating the sum of two sinusoidal signals with different relative phase differences.
Figure 5:
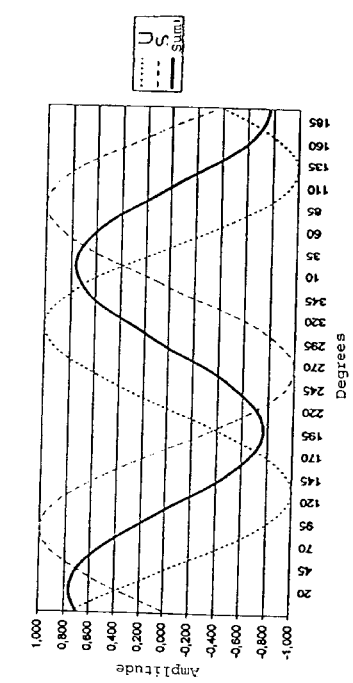
Figure 6:
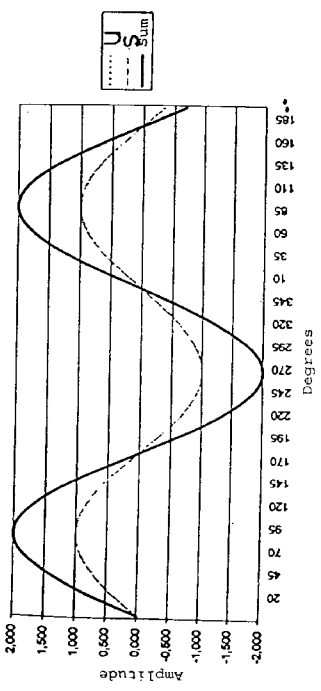
Figure 7:
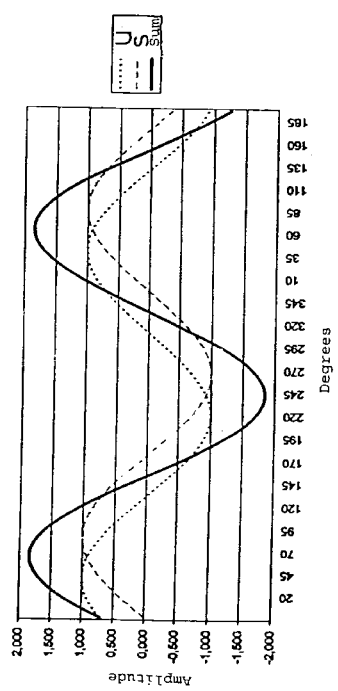

In the embodiment of FIG. 3, the system is able, in the condition in which the body 12 is stationary, to carry out a compensation of the effects due to the variations in permeability of the signal-transmission medium.

The system according to the variant of FIG. 3 comprises, in addition to the components already described with reference to FIG. 2, a mixer 44 supplied with the normalized signals $s'_{(t)}$ and $s''_{(t)}$ coming from the receivers 24', 24". Set downstream of the mixer 44 is a signal-power or signal-amplitude detector 46, followed by a low-pass filter 48. From the filter 48 a continuous signal is issued which has an amplitude proportional to the phase difference between the signals $s'_{(t)}$ and $s''_{(t)}$. The signal leaving the filter 48 is sent to an operation 50, the output of which is connected to a sample-hold circuit 52. A movement-detecting circuit 54 opens the sample-hold circuit 52 when both the output signals A and B are constant (situation in which the body 12 is stationary). Set in sequence downstream of the sample-hold circuit 52 are a voltage-to-frequency converter 56 and a phase-locked frequency multiplier 58 which drives the oscillator 16. If the phase difference between the signals $s'_{(t)}$ and $s''_{(t)}$ remains constant, at output from the filter 48 a constant and continuous signal is obtained. There will be an increase in the level of the signal due to the Doppler effect when the moving body moves away from the fixed part, and a reduction when it approaches the fixed part.

With the moving body is stationary, there will be variations in the amplitude of the signal leaving the filter 48 if the permeability of the signal-propagation medium varies in the area where the receivers 24' and 24" are located. This variation is detected by the amplifier 50, which, through opening of the sample-hold circuit by the detecting circuit 54, drives the voltage-to-frequency converter 56.

In fact, as a result of a decrease in the permeability of the medium, the speed of propagation c of the signal decreases; i.e., the same effect is obtained as for an increase in frequency. Since the distance δd is fixed, on the mixer 44 two sine waves are compared which have a phase difference no longer of λ/q (for example, λ/4) but proportionally higher. By increasing the phase difference between the two signals $s'_{(t)}$ and $s''_{(t)}$ with respect to the original one, which was obtained, for example, with a relative phase difference of λ/4, a proportionally smaller peak value is obtained.

The reduction in the value of the signal on the comparator 50 is equivalent to causing a decrease in the input signal of the voltage-to-frequency converter 56. In the event of a decrease in the input voltage, the voltage-to-frequency converter 56 produces a reduction in the output frequency. This reduction in the output frequency is multiplied by the multiplier 58, and this leads to a proportional decrease in the frequency of the oscillator 16, and hence in the main frequency f. This decrease in the frequency f will bring about an increase in the wavelength λ, which will tend to eliminate the error. The sample-hold circuit 52 has the function of maintaining the last value of the signal at input to the voltage-to-frequency converter 56 constant during displacement of the moving body 12, whilst the movement-detecting circuit 54 has the function of enabling the sample-hold circuit when the body 12 is stationary and there is no dynamics on the output signals A and B.

What is claimed is:

1. A process for measuring the distance of a moving body (12) from a fixed part (10), characterized in that it comprises the steps of:

generating a first alternating signal ($r_{(t)}$) having a frequency within the radio-wave range or the elastic-wave range;

emitting the first signal from the fixed part towards the moving body (12);

receiving the first signal ($r_{(t)}$) on the moving body (12) and generating, on the moving body (12), a second signal ($s_{(t)}$) having a frequency (nf) equal to the frequency of the first signal ($r_{(t)}$) multiplied by a constant factor (n), the second signal ($s_{(t)}$) having an initial phase ($\phi_1$) equal to the phase ($2\pi f t_1 + \phi_0$) at the instant ($t_1$) in which it is received by the moving body (12);

generating, on the fixed part, a third signal ($u_{(t)}$) having a frequency (nf) equal to the frequency of the second signal ($s_{(t)}$) and an initial phase ($\phi_0$) equal to the initial phase of the first signal ($r_{(t)}$); and determining the variation in distance of the moving body (12) in a pre-set time interval as a function of the variation in the amplitude of an alternating signal obtained from the sum of the second signal ($s_{(t)}$) and the third signal ($u_{(t)}$) in the same time interval.

2. The process according to claim 1, characterized in that it comprises the step of receiving the signal ($s_{(t)}$) transmitted by the moving body (12) by means of two receivers (24', 24") set at a distance (δd) apart from one another and determining the direction of motion of the moving body (12) by comparing the signals (s'$_{(t)}$, s"$_{(t)}$).

3. The process according to claim 2, characterized in that it comprises a step of compensation of the effects due to a variation in the permeability of the signal-propagation medium, during which, with the moving body (12) in a stationary position, the frequency (f) of the first signal (r$_{(t)}$) is varied as a function of the difference with respect to a pre-set value of filling of the phase difference between said signals (s'$_{(t)}$, s"$_{(t)}$) received by said receivers (24', 24") that are set at a distance apart from one another.

4. The process according to claim 3, characterized in that the frequency of the aforesaid first signal (r$_{(t)}$) is between 300 kHz and 300 GHz.

5. The process according to claim 3, characterized in that the frequency of the aforesaid first signal (r$_{(t)}$) is between 40 kHz and 10 MHz.

6. The process according to claim 2, characterized in that the frequency of the aforesaid first signal (r$_{(t)}$) is between 300 kHz and 300 GHz.

7. The process according to claim 2, characterized in that the frequency of the aforesaid first signal (r$_{(t)}$) is between 40 kHz and 10 MHz.

8. The process according to claim 1, characterized in that the frequency of the aforesaid first signal (r$_{(t)}$) is between 300 kHz and 300 GHz.

9. The process according to claim 1, characterized in that the frequency of the aforesaid first signal (r$_{(t)}$) is between 40 kHz and 10 MHz.

10. A system for measuring the distance of a moving body (12) from a fixed part (10), characterized in that it comprises:

a generator (16) of a signal having a frequency within the radio-wave range or the elastic-wave range;

a transmitter (14) for emitting a first signal (r$_{(t)}$) towards a moving body (12);

means set on the moving body (12) which are designed to multiply the frequency of the signal received and to emit a second signal (s$_{(t)}$) towards the fixed part (10);

receiver means (24, 24', 24") for receiving the second signal (s$_{(t)}$); and means designed to supply an electric signal having an amplitude correlated to the difference correlated to the phase difference between the first signal (r$_{(t)}$) and the second signal (s$_{(t)}$).

* * * * *